United States Patent
Sridharan et al.

(10) Patent No.: US 11,418,942 B2
(45) Date of Patent: Aug. 16, 2022

(54) PROTECTING A USER DATA REPOSITORY (UDR) FROM OVER-ACCUMULATION OF SUBSCRIPTION REQUESTS IN A STANDALONE 5G NETWORK

(71) Applicant: T-Mobile USA, Inc., Bellevue, WA (US)

(72) Inventors: Srinivasan Sridharan, Bellevue, WA (US); Subramania Kaushik, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 45 days.

(21) Appl. No.: 17/130,308

(22) Filed: Dec. 22, 2020

(65) Prior Publication Data

US 2022/0201462 A1   Jun. 23, 2022

(51) Int. Cl.
*H04W 8/18* (2009.01)
(52) U.S. Cl.
CPC .................................... *H04W 8/18* (2013.01)
(58) Field of Classification Search
CPC ........... H04W 8/18; H04W 4/24; H04W 4/50; H04W 4/60; H04W 4/30; H04W 8/04; H04W 8/20; H04W 8/205; H04W 8/22; H04W 8/24; H04W 88/00; H04W 88/02; H04W 88/08; H04W 88/18; H04W 64/00; H04W 24/00; H04W 24/02; H04W 24/04; H04W 12/35; H04W 48/18; H04W 48/00; H04W 48/02; H04W 48/08; H04L 67/30; H04L 67/303; H04L 67/306; H04L 67/327
See application file for complete search history.

(56) References Cited

U.S. PATENT DOCUMENTS

| | | | |
|---|---|---|---|
| 2012/0207159 A1* | 8/2012 | Buchko et al. | 370/390 |
| 2013/0304885 A1* | 11/2013 | Acharya et al. | 709/223 |
| 2014/0068091 A1* | 3/2014 | T. et al. | 709/228 |
| 2020/0084490 A1* | 3/2020 | Largman et al. | H04N 21/2543 |
| 2021/0360074 A1* | 11/2021 | Long | H04L 67/16 |

FOREIGN PATENT DOCUMENTS

| | | | | |
|---|---|---|---|---|
| JP | 2018537735 A | * | 12/2018 | G06F 21/10 |
| WO | WO 2020211373 A1 | * | 10/2020 | H04L 12/26 |

* cited by examiner

*Primary Examiner* — Meless N Zewdu
(74) *Attorney, Agent, or Firm* — Loeb & Loeb LLP

(57) ABSTRACT

A computer-implemented method for protecting a user data repository (UDR) from over-accumulation of subscription requests in a subscriber profile of a subscriber of a 5G network may include receiving, from a network node on the 5G network, a new subscription request requesting a notification of status changes associated with the subscriber profile, retrieving the subscription profile from the UDR, and determining a number of preexisting subscription requests associated with a network function (NF) instance identification (ID) of the network node in the subscriber profile. If the number of preexisting subscription requests in the subscriber profile is equal to or greater than a predetermined value (X), the computer-implemented method may further include deleting at least one of the preexisting subscription requests from the subscriber profile and writing the new subscription request to the subscriber profile at the UDR.

20 Claims, 5 Drawing Sheets

PROTECTING A USER DATA REPOSITORY (UDR) FROM OVER-ACCUMULATION OF SUBSCRIPTION REQUESTS IN A STANDALONE 5G NETWORK

TECHNICAL FIELD

Embodiments discussed herein generally relate to methods and systems that protect a user data repository (UDR) of a 5G standalone wireless network from over-accumulation of subscription requests coming from network nodes.

BACKGROUND

The fifth generation (5G) technology standard for wireless networks offers faster speeds and ultra-low latency compared with earlier generations. The advantages of 5G include features such as faster access to information and faster downloads, as well as fast and robust connectivity between devices, machines, and objects, supporting remotely controlled industrial machines and robots, remote surgery, connected cars, and the Internet of things, for example. The initial 5G networks were operated on top of existing long-term evolution (LTE) networks, whereas a standalone 5G network is operated independently. In a standalone 5G network, the user equipment (UE) connects to the new radio based access network (gNode Bs) and the user plane function (UPF) which connects the UE to the data network (Internet or IMS) to provide a voice or data session. However, as a standalone 5G network has only recently been deployed, issues with the network are still being discovered.

The core network of a standalone 5G network may include network nodes that operate to keep a session active for the subscriber, ensure that that the session follows the subscriber as he or she moves around the network, and provide services associated with the subscriber's 5G plan. These network nodes may include the access and mobility management function (AMF), the session management function (SMF), and the short message service function (SMSF), for example. The AMF, the SMF, and the SMSF may register to the user data management (UDM) node to provide 5G services for a subscriber and inform the UDM of which nodes are serving the subscriber. Once registered, the AMF, the SMF, and the SMSF may send individual subscription requests to the UDM requesting a notification from the UDM if any changes associated with the subscriber profile occurs during the 5G session. The UDM may write these subscription requests to the user data repository (UDR) database where the subscriber profile resides. The UDR is a common database that stores subscriber profile data and subscription requests for all subscribers on the 5G network as well as 4G and 3G networks that are supported by the same network carrier. If not removed via deregistration from the respective network node, these subscription requests may accumulate in the individual subscriber profiles and become stale entries at the UDR that continue to grow. An over-accumulation of subscription requests may cause an overload situation at the UDR, potentially causing session breakdown, dropped calls, call rejection, or even network crashing. For example, when a deregistration request is received from the AMF, the SMF, or the SMSF at the UDM, the UDM may initiate a mass delete of the accumulated subscription requests from the respective network node at the UDR, possibly triggering a network outage in extreme circumstances, particularly if this happens for hundreds or thousands of subscriber profiles at the same time. This may have a cascading effect on other services (e.g., 3G, 4G) provided by the same network carrier.

There is currently no mechanism in place to protect the UDR database from over-accumulation of subscription requests that may occur in the operation of a standalone 5G network, thus making the network vulnerable to service failures and outage. Thus, there is a need for strategies to avoid accumulation of stale subscription requests at the UDR in standalone 5G networks.

SUMMARY

Embodiments disclosed herein provide a technical solution for regulating the number of subscription requests that accumulate in subscriber profiles of a user data repository (UDR) in standalone 5G wireless networks. In one embodiment, a computer-implemented method for protecting a UDR from over-accumulation of subscription requests in a 5G network is disclosed. The computer-implemented method may include receiving, from a network node on the 5G network, a new subscription request requesting a notification of status changes associated with a subscriber profile of a subscriber on the 5G network. The new subscription request may include a network function (NF) instance identification (ID) associated with the respective network node. The computer-implemented method may further include retrieving the subscriber profile from the UDR, and determining a number of preexisting subscription requests in the subscriber profile associated with the NF instance ID. If the number of preexisting subscription requests is equal to or greater than a predetermined value (X), the computer-implemented method may further include deleting at least one of the preexisting subscription requests from the subscriber profile and writing the new subscription request to the subscriber profile at the UDR.

In another embodiment, a system for protecting a user data repository (UDR) from over-accumulation of subscription requests in a 5G network is disclosed. The system may include the 5G network, one or more network nodes on the 5G network serving a subscriber during an active session of the subscriber on the 5G network, and a user data management (UDM) node on the 5G network associated with the UDR storing a subscriber profile of the subscriber. The UDM node may include a computer system having a processor configured according to computer-executable instructions for receiving, from one of the network nodes, a new subscription request requesting a notification of status changes associated with the subscriber profile, wherein the new subscription request includes a network function (NF) instance identification (ID) associated with the respective network node. The processor of the UDM node may be further configured according to computer-executable instructions for retrieving the subscriber profile from the UDR, and determining a number of preexisting subscription requests in the subscriber profile associated with the NF instance ID. If the number of preexisting subscription requests is equal to or greater than a predetermined value (X), the processor may be further configured according to computer-executable instructions for replacing one of the preexisting subscription requests in the subscriber profile with the new subscription request.

BRIEF DESCRIPTION OF THE DRAWINGS

The disclosure may be better understood by reference to the detailed description when considered in connection with the accompanying drawings. The components in the figures are not necessarily to scale, emphasis instead being placed upon illustrating the principles of the disclosure.

DETAILED DESCRIPTION

Figure 1:
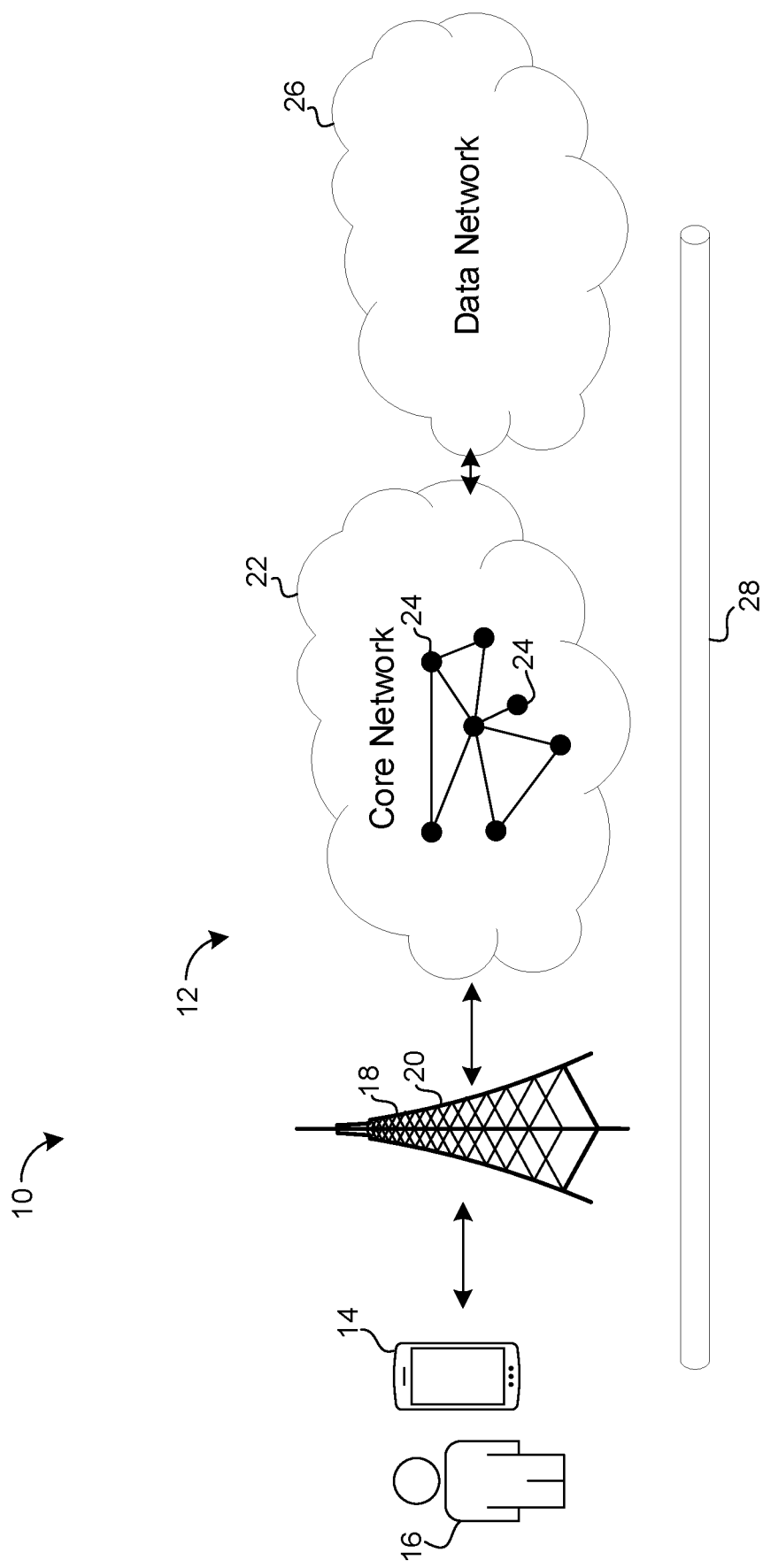
FIG. 1 is a schematic representation of a system including a standalone 5G wireless network, according to one embodiment.

Referring now to the drawings and with specific reference to FIG. 1, a system 10 including a 5G wireless communication network 12 is shown. In one embodiment, the 5G network 12 is a standalone 5G network which operates independently without requiring an underlying or integrated long-term evolution (LTE) network. The system 10 may include the standalone 5G network 12 and user equipment (UE) 14 (e.g., a mobile phone, a tablet, a computer, etc.) of subscribers 16 of the network 12. The standalone 5G network 12 may include a new radio access network (RAN) 18 having gNodeBs 20 serving as base stations, and a core network 22 having various network nodes 24. The 5G network 12 may connect the UE 14 to a data network 26 such as the Internet or IP Multimedia Subsystem (IMS). To establish a voice or data session 28 (a Packet Data Unit (PDU) session) for a particular subscriber 16, the subscriber's UE 14 may connect to the RAN 18 which offers connectivity to a user plane function (UPF) of the core network 22 which then connects to the data network 26 to allow exchange of voice and data packets over the 5G network 12.

The network nodes 24 may operate to provide various functions such as keeping the session 28 active for the subscriber 16, ensuring that the session follows the subscriber 16 as he or she changes location, and providing the network services in the subscriber's 5G data plan. For example, an access and mobility function (AMF) 30 (see FIG. 2) may monitor the tracking area or the cell that the subscriber 16 is located in, and may liaison with other network functions to ensure that the subscriber 16 is allowed on the network 12 and is allowed to receive certain network services. A session management function (SMF) 32 (see FIG. 2) may perform session management functions such as the establishment, modification, and tear down of PDU sessions. A short message service function (SMSF) 34 (see FIG. 2) may support the transfer of SMS messages over the 5G network 12.

Figure 2:
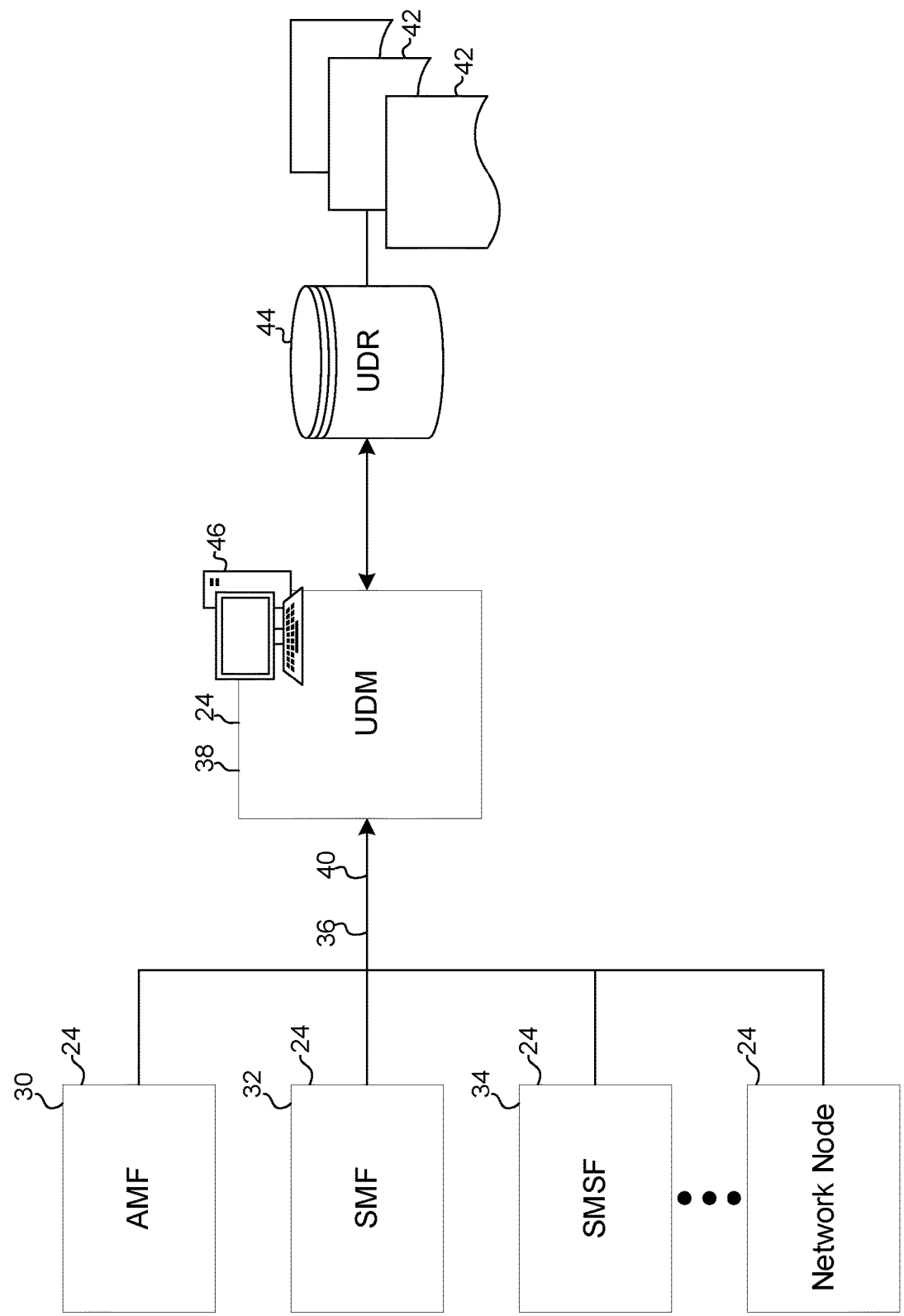
FIG. 2 is a schematic representation of certain interactions between network nodes of a core network of the 5G wireless network, according to one embodiment.

Certain interactions between some of the network nodes 24 of the core network 22 are shown in FIG. 2. When the UE 14 tries to attach to the 5G network 12, one or more of the AMF 30, the SMF 32, and the SMSF 34 (or other network nodes 24) may register 36 with a user data management (UDM) node 38 to provide 5G services to the subscriber 16 and to notify the UDM node 38 that these network nodes 24 are serving the subscriber 16. Once registered, the AMF 30, the SMF 32, and the SMSF 34 (or other network node 24) may each individually send a subscription request 40 to the UDM node 38 to request a notification of any status changes associated with a subscriber profile 42 of the subscriber 16 during the session 28. Changes to the subscriber profile 42 may include, for example, changes to services in the subscriber's 5G data plan, such as if the subscriber 16 changes their data plan or has not paid their bill. The subscription requests 40 may carry a unique network function (NF) instance identification (ID) (or other identification) identifying the respective network node 24 and providing an address to exchange messages with the UDM node 38. The subscription request 40 from the SMF 32 may additionally carry a data network name (DNN) to identify the particular SMF 32.

Upon receipt of a subscription request 40 from the AMF 30, the SMF 32, the SMSF 34, and/or other network node 24, the UDM node 38 may write the subscription request 40 to the subscriber profile 42 of the respective subscriber 16 at a user data repository (UDR) 44. In one embodiment, the UDR 44 may be a common database for subscriber profiles 42 for all of the subscribers on the 5G network 12 as well as subscribers of any 4G and/or 3G networks supported by a carrier of the 5G network 12. The UDM node 38 may communicate with the UDR 44 to retrieve the subscription profile 42 of the subscriber 16, and write the subscription request 40 to the subscriber profile 42 stored at the UDR 44. The UDM node 38 may also obtain information related to the subscriber profile 42 to determine if the subscriber profile 42 has changed for responding to the subscription requests 40.

If not cleared via deregistration from the respective network nodes 24 (e.g., the AMF 30, the SMF 32, or the SMSF 34), the subscription requests 40 associated with each NF instance ID (and DNN, if applicable) may continue to accumulate in the subscriber profiles 42 at the UDR 44. For example, the AMF 30, the SMF 32, and/or the SMSF 34 may not be able to send a deregistration request to the UDM node 38 properly and the subscription requests 40 related to the respective network node 24 may continue to grow in the subscriber profile 42. These subscription requests may become stale entries sitting in the subscriber profiles of hundreds, thousands, or millions of subscribers to the 5G network 12. This over-accumulation of subscription requests for the different subscribers may overload the memory of the UDR 44, making the UDR 44 susceptible to an overload condition potentially leading to dropped calls, rejected new calls, and possibly network crashing or outage. According to the present disclosure, the UDM node xx is modified to include new functions that control the amount of subscription requests that accumulate at the UDR 44.

The UDM node 38 may include a computer system 46 that performs the functions of receiving the subscription requests 40, reading the NF instance ID (and DNN, if applicable) in each subscription request 40, and writing each subscription request 40 associated with a particular NF instance ID (and DNN, if applicable) to the corresponding subscriber profile 42 at the UDR 44. Additionally, the computer system 46 of the UDM node 38 may run one or more algorithms that regulate the number of subscription requests 40 that accumulate in the subscriber profiles 42 at the UDR 44 (see further details below). This may ultimately protect the UDR 44 from memory overload and the operation of the network 12 as a whole.

Figure 3:
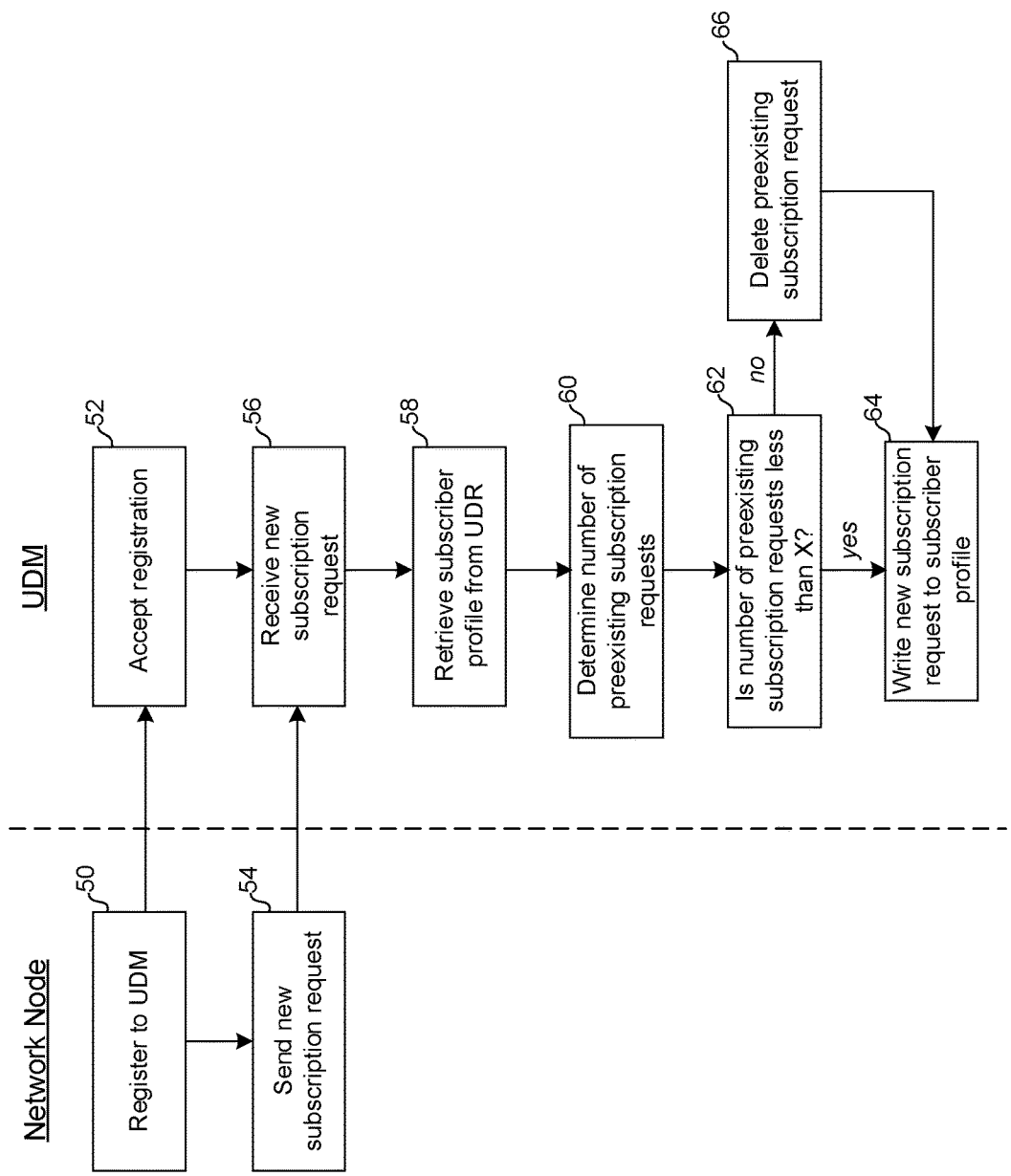
FIG. 3 is a flow chart illustrating an exemplary computer-implemented method for protecting a user data repository (UDR) of the 5G wireless network from over-accumulation of subscription requests, according to one embodiment.

Turning to FIG. 3, an exemplary method for protecting the UDR 44 from over-accumulation of subscription requests 40 is shown. The method is shown and described with respect to a single subscriber profile, however the concept is applicable for all subscriber profiles of the 5G network 12 that are stored at the UDR 44. At a first block 50, a network node 24 (e.g., the AMF 30, the SMF 32, the SMSF 34, or other network node) may register to the UDM node 38 when the UE 14 of the subscriber 16 attempts to attach to the 5G network 12. Once the registration is accepted at the UDM node 38 (block 52), the respective network node 24 may send a new subscription request to the UDM node 38 carrying an NF instance ID (and DNN, if applicable) and an identifier for the subscriber's account (block 54). The UDM node 38 may receive the new subscription request 40 (block 56), and apply the subscriber account identifier to retrieve the subscriber profile 42 of the individual subscriber 16 from the UDR 44 (block 58). At a next block 60, the UDM node 38 may determine the number of preexisting subscription requests in the subscriber profile 42 associated with the NF instance ID (and DNN, if applicable) that was carried in the new subscription request. As used herein, a preexisting subscription request is a subscription request stored in the subscriber profile 42 prior to the receipt of the new subscription request.

At a block 62, the UDM node 38 may determine whether the number of preexisting subscription requests in the subscriber profile 42 is less than a predetermined value (X). If the number of preexisting subscription requests is less than X, the UDM node 38 may write the new subscription request to the subscriber profile 42 at the UDR 44 without deleting any of the preexisting subscription requests (block 64). If, however, the number of preexisting subscription requests is equal to or greater than X, the UDM node 38 may delete one of the preexisting subscription requests from the subscriber profile 42 to free space for the new subscription request (block 66), and then write the new subscription request to the subscriber profile 42 (block 64). The blocks 66 and 64 result in replacement of the preexisting subscription request with the new subscription request.

In one embodiment, the block 66 may involve deleting the oldest subscription request associated with the NF instance ID/DNN in the subscriber profile 42. In this regard, the preexisting subscription requests in the subscriber profile 42 may be timestamped by the time that the requests were received at the UDM node 38 or were stored at the UDR 44, allowing the UDM node 38 to identify the oldest subscription request. In other embodiments, the preexisting subscription request selected for deletion may be selected according to other factors such as the amount of memory used, or whether the subscription request is a duplicate. In yet other embodiments, the UDM node 38 may delete multiple preexisting subscription requests in the subscriber profile 42 if the number of preexisting subscription requests exceeds X. For instance, the UDM node 38 may delete as many preexisting subscription requests as needed to bring the number of preexisting subscription requests to a value below X before the new subscription request is written to the subscriber profile 42.

According to the method of FIG. 3, the UDM node 38 may operate to limit the number of subscription requests associated with each NF instance ID/DNN in the subscriber profile 42. The predetermined value (X) may be a static value that is input into the UDM node 38 by a network operator or engineer. In one non-limiting embodiment, X may be 10 or less. In other non-limiting embodiments, X may be 5 or less, or 3 or less. In other embodiments, X may be any number configured for the particular 5G network xx. In yet other alternative embodiments, X may be set to dynamically change according to a network performance parameter that fluctuates over time in the 5G network 12, such as network congestion level.

Figure 4:
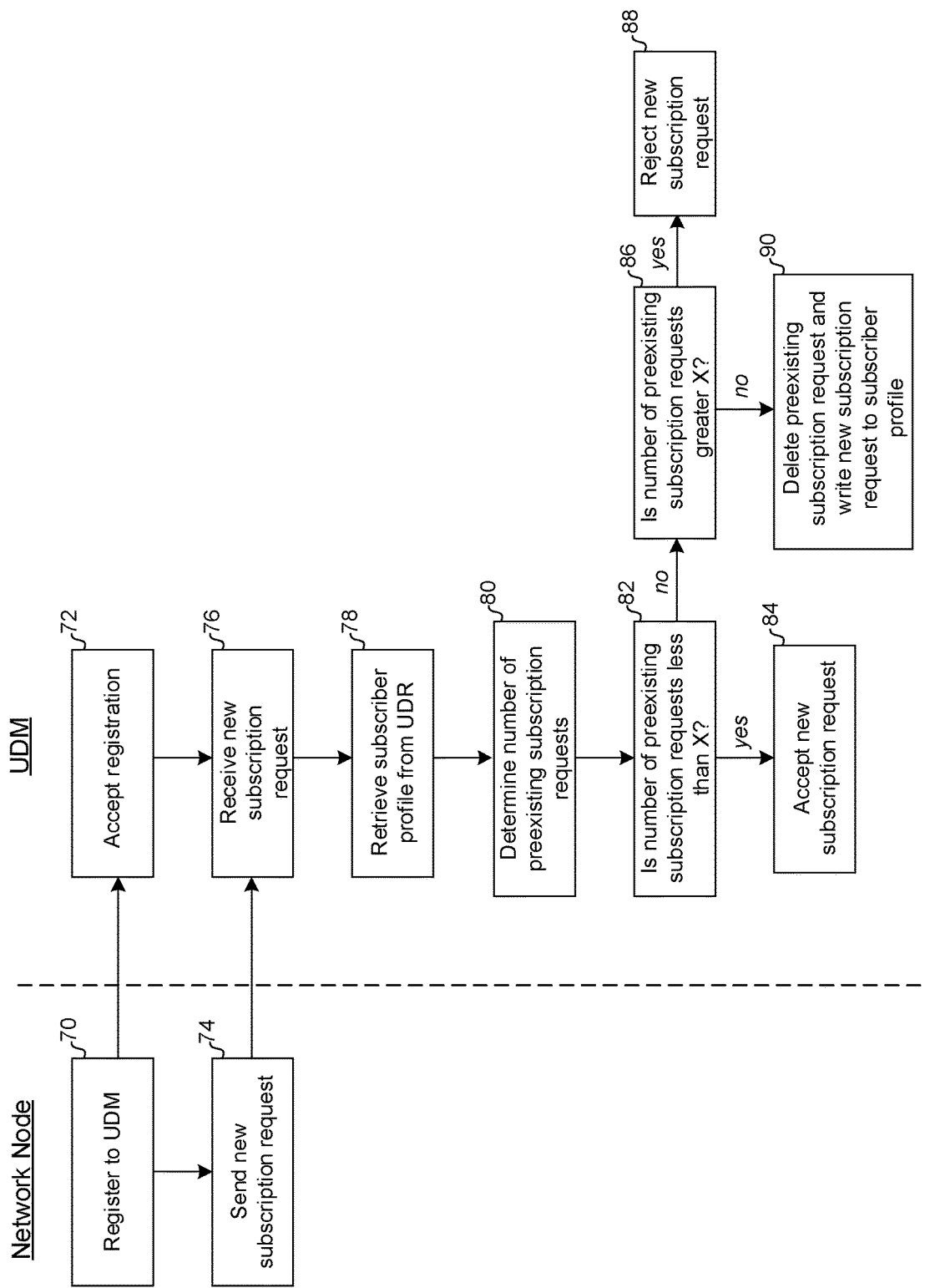
FIG. 4 is a flow chart illustrating another exemplary computer-implemented method for protecting the UDR from over-accumulation of subscription requests, according to one embodiment.

FIG. 4 shows another exemplary method for protecting the UDR 44 from over-accumulation of subscription requests. As above, the method of FIG. 4 is shown and described with respect to a single subscriber profile, but may be extended to all subscriber profiles of the 5G network 12 that are stored at the UDR 44. The network node 24 (e.g., the AMF 30, the SMF 32, the SMSF 34) may register to the UDM node 38 when the UE 14 of the subscriber 16 attempts to attach to the 5G network 12 (block 70), and the UDM node 38 may accept the registration (block 72). Once registered with the UDM node 38, the network node 24 may send to the UDM node 38 a new subscription request carrying an NF instance ID (and DNN, if applicable) associated with the network node 24 and an account identifier for the subscriber 16 (block 74). Upon receipt of the new subscription request at a block 76, the UDM node 38 may use the account identifier to retrieve the subscriber profile 42 for the subscriber 16 from the UDR 44 at a block 78.

At blocks 80 and 82, the UDM node 38 may determine the number of preexisting subscription requests in the subscriber profile 42, and determine whether the number of preexisting subscription requests is less than the predetermined value (X). If the number of preexisting subscription requests is less than X, the UDM node 38 may accept the new subscription request (block 84). The block 84 may involve writing the new subscription request to the subscriber profile 42 without deleting any of the preexisting subscription requests. If the number of subscription requests is not less than X, the UDM node 38 may determine whether the number of preexisting subscription requests exceeds X at a block 86. If so, the new subscription request may be rejected at a block 88. If, however, the number of preexisting subscription requests is equal to X, the UDM node 38 may delete one of the preexisting subscription requests from the subscriber profile 42, and write the new subscription request to the subscriber profile 42 (block 90), effectively replacing an old subscription request in the subscriber profile 42 with a new one and preventing the number of subscription requests from increasing above X. The block 90 may involve deleting an oldest subscription request associated with the NF instance ID/DNN in the subscriber profile 42.

In the method of FIG. 4, the UDM node 38 caps the number of subscription requests associated with NF instance ID/DNN in the subscriber profile to X, or at least prevents the number of subscription requests from accumulating further if the number is above X. In an alternative embodiment, instead of rejecting the new subscription request if the number of preexisting subscription requests exceeds X, the UDM node 38 may delete as many preexisting subscription requests as needed to bring the number of preexisting subscription requests to a value below X, and then write the new subscription request to the subscriber profile 42.

Although the steps of FIGS. 3-4 are shown as being performed in a certain order, it will be understood that the steps may be performed in different orders or simultaneously in practice. Further, the UDM node 38 may be capable of performing the methods of FIG. 3 or 4 for thousands or even millions of subscriber profiles that are stored at the UDR 44.

Figure 5:
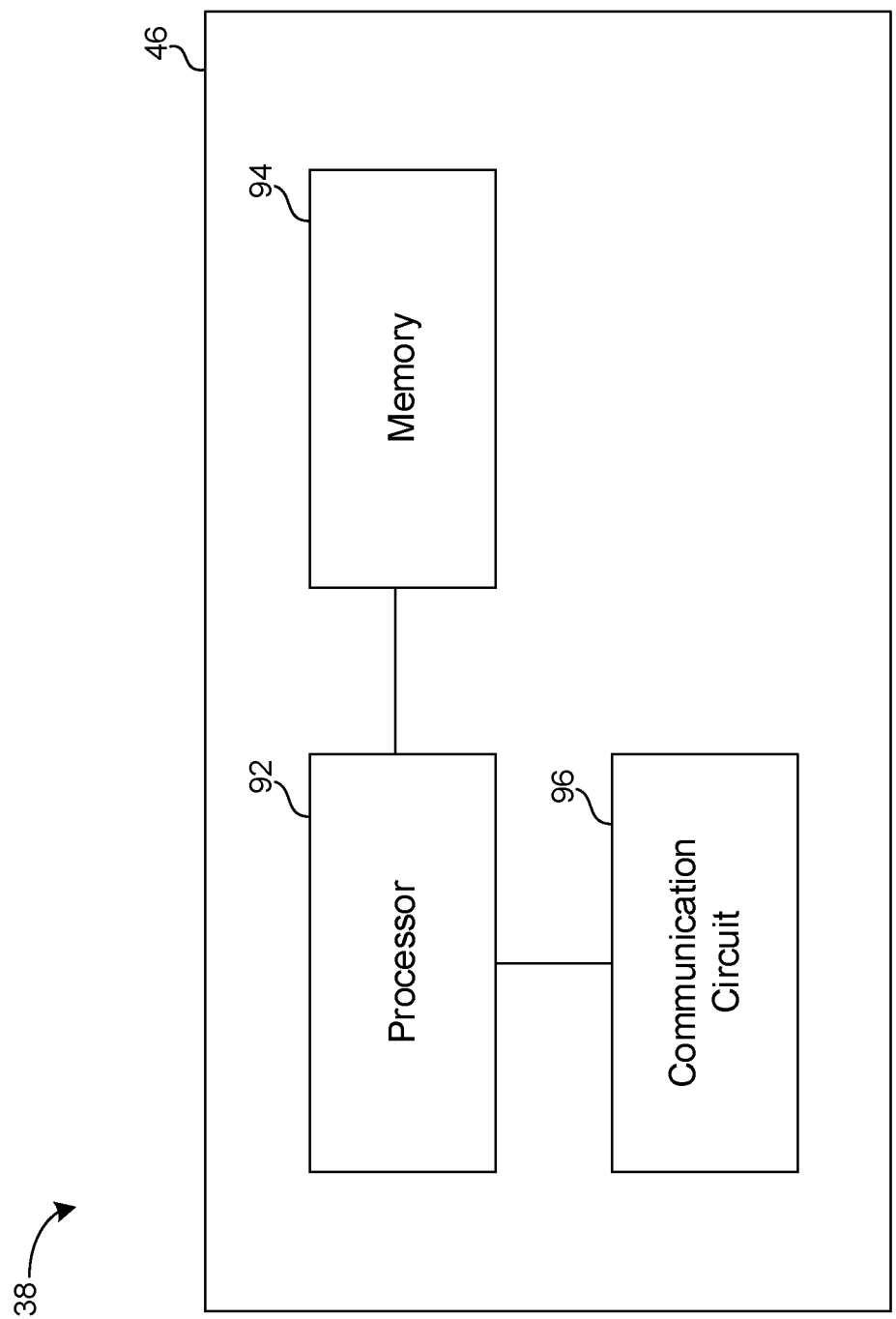
FIG. 5 is a schematic representation of a computer system of a user data management (UDM) node of the 5G wireless network, according to one embodiment.

FIG. 5 is a simplified schematic representation of the UDM node 38. The UDM node 38 may include the computer system 46 having a processor 92 configured to execute computer-executable instructions for performing the aforementioned steps of FIGS. 3 and 4 including receiving new subscription requests, retrieving the corresponding subscriber profiles from the UDR 44, and writing and deleting subscription requests to and from the subscriber profiles based on the number of preexisting subscription requests therein and the predetermined value (X). The computer system 46 of the UDM node 38 may further include a memory 94 configured to store the computer-executable instructions and assist the processor 92. Furthermore, the computer system 46 may include a communication circuit 96 for receiving and transmitting data from and to other elements of the 5G network 12, such as the network nodes 24 (e.g., the AMF 30, the SMF 32, the SMSF 34, etc.) and the UDR 44.

The present disclosure provides a technical solution to the problem of over-accumulation of subscription requests in subscriber profiles at the UDR in standalone 5G networks. New functions are introduced at the UDM node that effectively regulate the number of subscription requests in each subscriber profile at the UDR and prevent the subscription requests from growing to an excessive number. The UDM node may communicate with the UDR to determine whether the number of stored, preexisting subscription requests in a subscriber profile is less than, equal to, or greater than a predetermined value (X) when a new subscription request for the subscriber's session comes into the UDM node. Based on this determination, the UDM node may make a decision as to how to handle the new subscription request and manage the preexisting subscription requests in the subscriber profile such as writing the new subscription request to the subscriber profile without deleting a preexisting subscription request, replacing a preexisting subscription request with the new subscription request, rejecting the new subscription request, or deleting several preexisting subscription requests and writing the new subscription request to the subscriber profile. These new functions at the UDM node limit the number of subscription requests that may accumulate in each subscriber profile according to the predetermined value (X). The predetermined value (X) may be a configurable parameter input into the UDM system, and may vary depending on the needs of the particular network environment.

The benefits of limiting the number of subscription requests in the subscriber profiles stored at the UDR include reduced strain on the UDR memory, reduced session breakdown, and a reduction in network outages stemming from UDR memory overload. As a result, the performance of the standalone 5G network may be improved by the technology disclosed herein.

What is claimed is:

1. A computer-implemented method for protecting a user data repository (UDR) from over-accumulation of subscription requests in a 5G network, comprising:
   receiving, from a network node on the 5G network, a new subscription request requesting a notification of status changes associated with a subscriber profile of a subscriber on the 5G network, the new subscription request including a network function (NF) instance identification (ID) associated with the network node;
   retrieving the subscriber profile from the UDR;
   determining a number of preexisting subscription requests in the subscriber profile associated with the NF instance ID; and
   if the number of preexisting subscription requests is equal to or greater than a predetermined value (X), deleting at least one of the preexisting subscription requests from the subscriber profile and writing the new subscription request to the subscriber profile at the UDR.

2. The computer-implemented method of claim 1, wherein if the number of subscription requests is less than X, the computer-implemented method further comprises writing the new subscription request to the subscriber profile in the UDR without deleting one of the preexisting subscription requests from the subscriber profile.

3. The computer-implemented method of claim 1, wherein deleting at least one of the preexisting subscription requests from the subscriber profile comprises deleting an oldest subscription request associated with the NF instance ID in the subscriber profile.

4. The computer-implemented method of claim 1, wherein X is 10 or less.

5. The computer-implemented method of claim 1, wherein X is 5 or less.

6. The computer-implemented method of claim 1, wherein the computer-implemented method is performed by computer system of a user data management (UDM) node of the 5G network.

7. The computer-implemented method of claim 1, wherein the network node is one of an access and mobility function (AMF), a session management function (SMF), and a short message service function (SMSF).

8. The computer-implemented method of claim 1, wherein the 5G network is a standalone 5G network.

9. A system, comprising:
   a 5G network;
   one or more network nodes on the 5G network serving a subscriber during an active session of the subscriber on the 5G network; and
   a user data management (UDM) node on the 5G network associated with a user data repository (UDR) storing a subscriber profile of the subscriber, the UDM node including a computer system having a processor configured according to computer-executable instructions for:
      receiving, from one of the network nodes, a new subscription request requesting a notification of status changes associated with the subscriber profile, the new subscription request including a network function (NF) instance identification (ID) associated with the respective network node,
      retrieving the subscriber profile from the UDR,
      determining a number of preexisting subscription requests in the subscriber profile associated with the NF instance ID, and
      if the number of preexisting subscription requests is equal to or greater than a predetermined value (X), replacing one of the preexisting subscription requests in the subscriber profile with the new subscription request.

10. The system of claim 9, wherein replacing one of the preexisting subscription requests in the subscriber profile with the new subscription request includes deleting one of the preexisting subscription requests from the subscriber profile prior to writing the new subscription request to the subscriber profile.

11. The system of claim 10, wherein deleting one of the preexisting subscription requests from the subscriber profile comprises deleting an oldest subscription request associated with the NF instance ID in the subscriber profile.

12. The system of claim 11, wherein if the number of preexisting subscription requests is less than the predetermined value (X), the computer-implemented method further comprises writing the new subscription request to the subscriber profile in the UDR without deleting one of the preexisting subscription requests from the subscriber profile.

13. The system of claim 12, wherein the network node is one of an access and mobility function (AMF), a session management function (SMF), and a short message service function (SMSF).

14. The system of claim 12, wherein X is 10 or less.

15. The system of claim 12, wherein X is 5 or less.

16. The system of claim 12, wherein X dynamically varies based on network congestion level in the 5G network.

17. The system of claim 12, wherein the 5G network is a standalone 5G network.

18. A computer-implemented method, comprising:
receiving, at a user data management (UDM) node of a 5G wireless communication network, a new subscription request requesting a notification of status changes associated with a subscriber profile of a subscriber of the network, the new subscription request being received at the UDM node from a network node on the network, the new subscription request carrying an identification (ID) associated with the network node; and at a computer system of the UDM node,
retrieving the subscriber profile from a user data repository (UDR),
determining a number of preexisting subscription requests associated with the ID in the subscriber profile, and
writing the new subscription request to the subscriber profile at the UDR without deleting one of the preexisting subscription requests from the subscriber profile only if the number of preexisting subscription requests is less than a predetermined value (X).

19. The computer-implemented method of claim 18, further comprising rejecting the new subscription request if the number of preexisting subscription requests is greater than X.

20. The computer-implemented method of claim 18, further comprising deleting one of the preexisting subscription requests from the subscriber profile and writing the new subscription request to the subscriber profile if the number of subscription requests is equal to X.

* * * * *